United States Patent Office 2,900,393
Patented Aug. 18, 1959

---

2,900,393

PREPARATION OF 3-METHYL 1,3-PROPANE SULTONE

Edward Broderick, Philadelphia, Pa., assignor to Rohm & Haas Company, Philadelphia, Pa., a corporation of Delaware No Drawing. Application December 11, 1956
Serial No. 627,573

3 Claims. (Cl. 260—327)

This invention relates to an improved process for preparing 3-methyl 1,3 propane sultone, also identifiable as the cyclic anhydride of 3-hydroxy 3-methyl propyl, sulfonic acid, a compound which is highly useful for introducing water solubilizing groups into a wide range of compounds and for other, more direct applications. The present invention is a far simpler and more economical way of preparing 3-methyl 1,3 propane sultone than has heretofore been known.

According to this invention, an unsaturated sulfonic acid, specifically crotyl sulfonic acid, is caused to undergo a cyclization process which consists of heating the named starting substance, generally under greatly reduced pressure, and distilling off the desired end product within the appropriate temperature range. The crotyl sulfonic acid preferably is prepared by reacting crotyl chloride (also identifiable as gamma methyl allyl chloride) with sodium sulfite and water, whereupon a mixture of sodium crotyl sulfonate and sodium chloride is obtained. The reaction can be accelerated by using potassium bromide as a catalyst. This mixture is suspended in a relatively large quantity of anhydrous methanol and a comparatively small quantity of water. Dry hydrogen chloride gas then is passed into the suspension until the mixture becomes saturated with HCl, thereby forming the crotyl sulfonic acid and more sodium chloride, after which it is filtered to remove the sodium chloride. The clear filtrate is an aqueous methanol solution of crotyl sulfonic acid.

Although the crotyl chloride compound is known, it may be well to indicate a method for its preparation which I have found to be convenient. It is prepared by reacting 1,3 butadiene with HCl, using $Cu_2Cl_2$ as a catalyst and glacial acetic acid as the solvent. This reaction forms three parts of crotyl chloride and one part of alpha methyl allyl chloride. These two isomers may be readily separated by distillation. The alpha methyl allyl chloride can be treated with $FeCl_3$ at room temperature to form three more parts of crotyl chloride and one part of alpha methyl allyl chloride.

The process of the present invention will be readily understood from the examples of actual properations which follow. As the description proceeds comment will be made as to certain variations of the steps which may be employed with equivalent success, and explanations will be given for certain of the techniques which are utilized in order to make entirely clear the preferred modes of practicing the invention.

Examples 36.2 g. (0.4 mole) of crotyl chloride was placed in a 500 ml., three-necked flask fitted with a stirrer, thermometer and condenser. The balance of the charge consisted of 120 g. of water, 50.4 g. of sodium sulfite (0.4 mole), and 0.5 g. of potassium bromide. (Note.—In other experiments which were run, under the same conditions, with the same quantities, the potassium bromide, which acts as a catalyst, was omitted. The results were the same except that the reaction took longer.) The reaction mixture was stirred and heated at reflux for an hour, during which time the temperature of the mixture rose from 77° to 102° C. (Note.—In other experiments which were run, using the same quantities, and, with one exception, the same conditions, this heating step was continued for as much as three and a half hours, but the temperature of the mixture never rose any higher than 102° C., indicating that the reaction is completed within the first hour.)

The reaction mixture next was vacuum stripped, by heating at 100° C. and a pressure of 20 mm., thereby removing all water and leaving a dry white solid (83.8 g.)—a mixture of sodium chloride and sodium crotyl sulfonate. The sulfonate was converted to the free acid by suspending 82.5 g. of the powdered sodium chloride-sodium crotyl sulfonate in 250 ml. of anhydrous methanol and 10 ml. of water. (Note.—The water is not essential but it does help to dissolve the sulfonate. However, the water should be kept to a minimum because the sodium chloride is less soluble in methanol than in water and this is the basis for getting the sodium chloride out of solution.) Dry HCl gas was passed into the suspension while the contents of the flask were stirred and kept cool by running water over its outside walls. When the mixture was saturated with HCl it was filtered cold to remove the sodium chloride.

The filtrate was concentrated under reduced pressure to remove the methanol and water, and then heated under even more greatly reduced pressure. The liquid concentration step was done by heating it to 100° C. with the flask evacuated to a pressure of 20 mm. The pressure was then decreased to 0.8 mm. and a distillate weighing 25.4 g. was collected at 123° to 129° C. (Note.—A number of additional distillations were carried out in which the pressure was varied, with resultant variations in temperature at which the distillate was collected. From these experiments it was determined that this step can be performed quite satisfactorily with pressures ranging from 0.1 to about 600 mm. The distillate is collectable, in these instances, at temperatures as low as 65° C. (at 0.1 mm.) and as high as 300° C. (at 600 mm.). From this data it appears safe to assume that this step can be performed acceptably at any combination of pressure and temperature below that which will cause the compound to decompose.) The distillate was found to be 3-methyl 1,3 propane sultone. To obtain a somewhat purer cut, a fraction of the distillate was redistilled under a pressure of 5.0 mm. The product was found to boil in the range of 146° to 149° C. (Note.—This redistillation step is performable quite satisfactorily at temperatures and pressures within the ranges indicated above for the primary distillation.) Its saponification number was found to be 413, which compares favorably with the theoretical value of 412. The refractive index of the liquid at 25° C. was determined to be 1.4512, and the melting point when in the solid form proved to be —9° C. A sample of the product was dissolved in dilute warm NaOH and converted to the sodium sulfonate. The sulfonate gave a positive iodoform test, indicating that it contained a secondary hydroxyl group and that the sultone itself was actually 3-methyl 1,3 propane sultone which has the following structural formula:

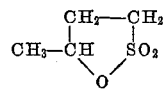

I claim:
1. A process for making 3-methyl 1,3 propane sultone which comprises distilling crotyl sulfonic acid and col- lecting the distillate which comes off at a temperature between 65° and 300° C.

2. A process for making 3-methyl 1,3 propane sultone which comprises distilling crotyl sulfonic acid under a pressure of from 0.1 to 600 mm. and collecting the distillate which comes off at a temperature between 65° and 300° C.

3. The process of claim 2, additionally comprising the step, after the distillate is collected, of redistilling it under a pressure of about 0.5 mm. and collecting the distillate which comes off at a temperature between 146° and 149° C.

References Cited in the file of this patent

FOREIGN PATENTS

| | | |
|---|---|---|
| 860,637 | Germany | Dec. 22, 1952 |
| 887,341 | Germany | Aug. 24, 1953 |
| 899,939 | Germany | Dec. 17, 1953 |

OTHER REFERENCES

Helberger et al.: Liebigs' Annalen, vol. 562, pp. 32–35 (1949).

Mustafa: Chemical Reviews, vol. 54, pp. 197–198 (1954).